United States Patent
Levesque et al.

[11] 3,800,473
[45] Apr. 2, 1974

[54] BORE GRINDING MACHINE

[75] Inventors: George Napoleon Levesque, Warwick; Alexander Norval Booth, Jr., Esmond, both of R.I.

[73] Assignee: Brown & Shapiro Manufacturing Company, North Kingstown, R.I.

[22] Filed: Aug. 4, 1972

[21] Appl. No.: 278,105

[52] U.S. Cl.................... 51/5, 51/50 PC, 51/101 R, 51/240 T, 51/269
[51] Int. Cl............................................ B24b 19/00
[58] Field of Search............................. 51/268–274, 51/50 R, 50 PC, 101 R, 105 R, 5, 131, 133, 216 R, 216 T, 240 R, 240 T

[56] References Cited
UNITED STATES PATENTS

| | | | |
|---|---|---|---|
| 2,753,668 | 7/1956 | Strnad.............................. | 51/273 X |
| 3,466,811 | 9/1969 | Suddarth.......................... | 51/268 X |
| 2,435,320 | 2/1948 | Metzger........................... | 51/131 UX |
| 3,634,978 | 1/1972 | Uhtenwoldt...................... | 51/5 X |

FOREIGN PATENTS OR APPLICATIONS

| | | | |
|---|---|---|---|
| 1,117,569 | 6/1968 | Great Britain.................... | 51/105 R |

*Primary Examiner*—Donald G. Kelly
*Attorney, Agent, or Firm*—Barlow & Barlow

[57] ABSTRACT

A bore grinding machine having a horizontal work table rotatably mounted on a base. The work table has a portion of its central area cut away to form a passageway opening for a vertical tool spindle assembly which is mounted with its top portion in said opening. The tool spindle assembly is mounted on a vertical slide which allows the top portion of the spindle assembly to be raised above the top surface of the work table when in grinding position and allowed to be lowered back into said passageway opening where it is out of the way and below the top of the table during loading and unloading of the work pieces to be machined. A wheel dressing unit is mounted below the top of the passageway opening which dresses the grinding wheel upon movement thru the opening. A retractable guard cover is mounted below the top of the opening to cover the grinding wheel when a worker is loading or unloading the parts to be machined on the top of the table. A combination wheel guard and coolant hood is pivotally mounted on the top of the work table support and it covers the work piece and work table during the grinding operation while coolant is being floodingly circulated therewith. A plurality of cams are used to control the x axis movement of the work table with respect to the grinding wheel and the y axis movement of the wheel feed slide with respect to the work while a work rotation gear forming a part of the rotatable table is connected to a drive motor that controls the concurrent rotation of the work table.

7 Claims, 6 Drawing Figures

BORE GRINDING MACHINE

BACKGROUND OF THE INVENTION

This invention relates to a grinding machine and more specifically to a bore grinding machine whose spindle axis is positioned vertically and which extends upwardly from its mounting structure through an opening in its horizontally mounted work table. In the past bore grinding machines have been designed either with their spindles horizontally mounted or with vertically these mounted spindles that were supported or mounted from above the work table. These designs have proven adequate where the grinding operations have been utilized on small pieces and where a sophisticated machining operation was not being carried out. These types of machines were not of a heavy duty type machine which would be suitable for grinding larger pieces. Where the spindles were mounted along a horizontal axis, there was a definite limitation on the size of the work pieces which could be rigidly supported by the machine with any attempt to provide a rotational movement to those held work pieces being impractical. As to the machines having the spindle mounted vertically and overhead of the work table, these also have their limitations due to the fact that it is extremely difficult to rigidly mount the spindles in the overhead position where the work pieces to be machined were large in size.

Another problem of the former bore grinding machines was the inability to provide them with an enclosure that would surround the grinding wheel during its operation. They couldn't be designed to allow a coolant to be pumped through the housing in a flooding type operation for both cooling purposes and also to provide a medium for carrying away material removed from the work piece. Also many of the bore grinding machines previously manufactured provided little or no safety for the operator from the rotating grinding wheel since there was constant wheel exposure. This provided continuous danger from flying metal particles removed from the work piece and provided exposure to the splash of any coolant supplied to the grinding surfaces of the work piece. Additionally a certain amount of danger existed during loading and unloading of the machine where the grinding wheel was constantly exposed. The designs of machines having a vertical work table or a horizontal work table mounted beneath an overhead vertically mounted grinding wheel spindle produced a machine which was difficult to load and unload when done manually and next to impossible where automatic loading and unloading was considered.

SUMMARY OF THE INVENTION

This bore grinding machine has been designed to eliminate the problems found prevalent in past machines. It has been designed as a heavy duty rugged machine suitable for continuous automotive duties. The entire structure of the machine has been designed to give a clean flat top area in the area of the work table for easy manual and automatic loading. This open table provides maximum parts handling room. A simple box type guard and hood is hinged to the top of the work table support of the machine to cover the work piece while it is being machined and it is also allows the interior thereof to be flooded with a coolant that eliminates overheating and also which carries the ground particles of metal away from the work area. Eliminated is any operator splash from the coolant since the wheel is always covered. The work table is rotatably mounted on a work rotation gear driven through suitable gearing by a hydraulic motor. The work table has a horizontal work surface upon which the work piece is secured by hydraulic work clamps. The work table and the work rotation gear have aligned openings in their central area which form a passageway opening for a vertically mounted tool spindle assembly. The spindle is mounted in hydrostatic bearings to provide stiffness for roughing and smoothness for fine finishes. The design of the spindle under the work is the most practical basic configuration that can be used when bore grinding other than small work pieces. It allows for rigidity in heavy work and it allows for close mechanical coupling to drive the spindle since no long slide movement is needed to clear the spindle from the work area. The spindle is mounted in a vertical slide which allows it to be retracted beneath the work table thus providing maximum safety for the operator. A sliding guard mounted within the work table member but beneath its top surface automatically covers the top of the grinding wheel after it has been retracted into its lower position. This prevents any wheel exposure to the operator which is extremely important in machines using high speed wheels. Also mounted beneath the work table is a wheel dressing mechanism which automatically dresses the outer surface of the grinding wheel as it is retracted into or raised from its lowermost position or both. Again this out of the way wheel truing arrangement provides the utmost in safety for the machine operator. The novel bore grinding machine has also been designed with a plurality of cam members that provide movement for the work table in the $x$ axis and the wheel feed slide in the $y$ axis concurrent with the rotational movement given to the work table. This design makes the machine especially adaptable to such grinding operations such as that of grinding the inner surface of a trochoidal configuration such as is found in the engine housing of a rotary piston engine, i.e., such as a Wankel engine.

It is an object of applicants to provide a machine capable of grinding intricate internal surfaces such as that found in a rotary engine housing.

It is also an object of applicants to provide a vertical bore grinding machine having an unobstructed area over its work table.

It is a further object of applicants to provide a grinding machine designed to insure the safety of the operator.

It is an additional object of applicants to provide a grinding machine having a completely enclosed work table that allows for flooding and through the wheel application of coolant.

DESCRIPTION OF THE PREFERRED EMBODIMENT

Figure 1:
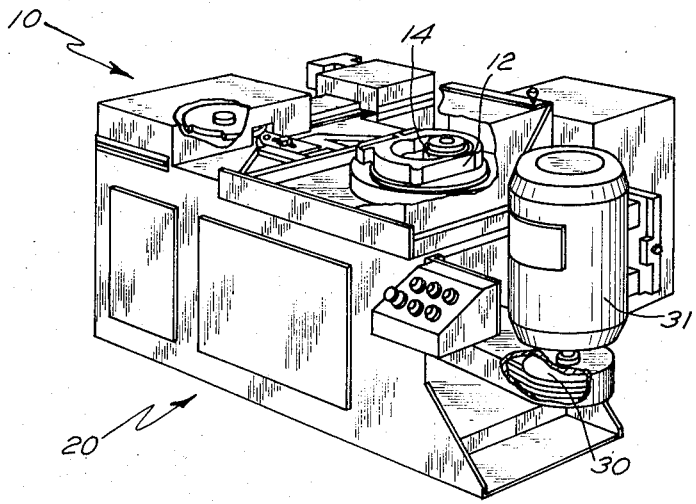
FIG. 1 is a perspective view of applicants' novel bore grinding machine with parts broken away.
Figure 2:
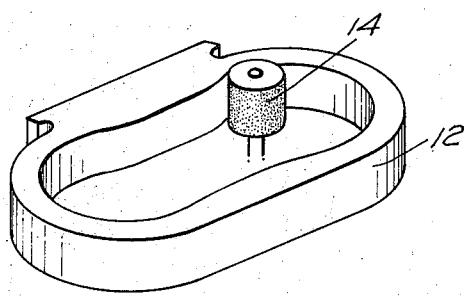
FIG. 2 is a perspective view illustrating a work piece having a trochoidal shape internal surface ground therein.

Referring to FIG. 1 of the drawings the novel bore grinding machine is generally designated by the numeral 10. The machine has been designed specifically for the purpose of grinding the bore of rotary engine housings having a trochoidal shape. However, it is to be realized that the grinding machine itself could be adapted to grind the bore of numerous other work pieces having intricate internal bore surface areas. An example of the trochoidal shape bore is illustrated in FIG. 2 where the rotary engine housing work piece is indicated by numeral 12 and the grinding wheel by numeral 14.

Figure 3:
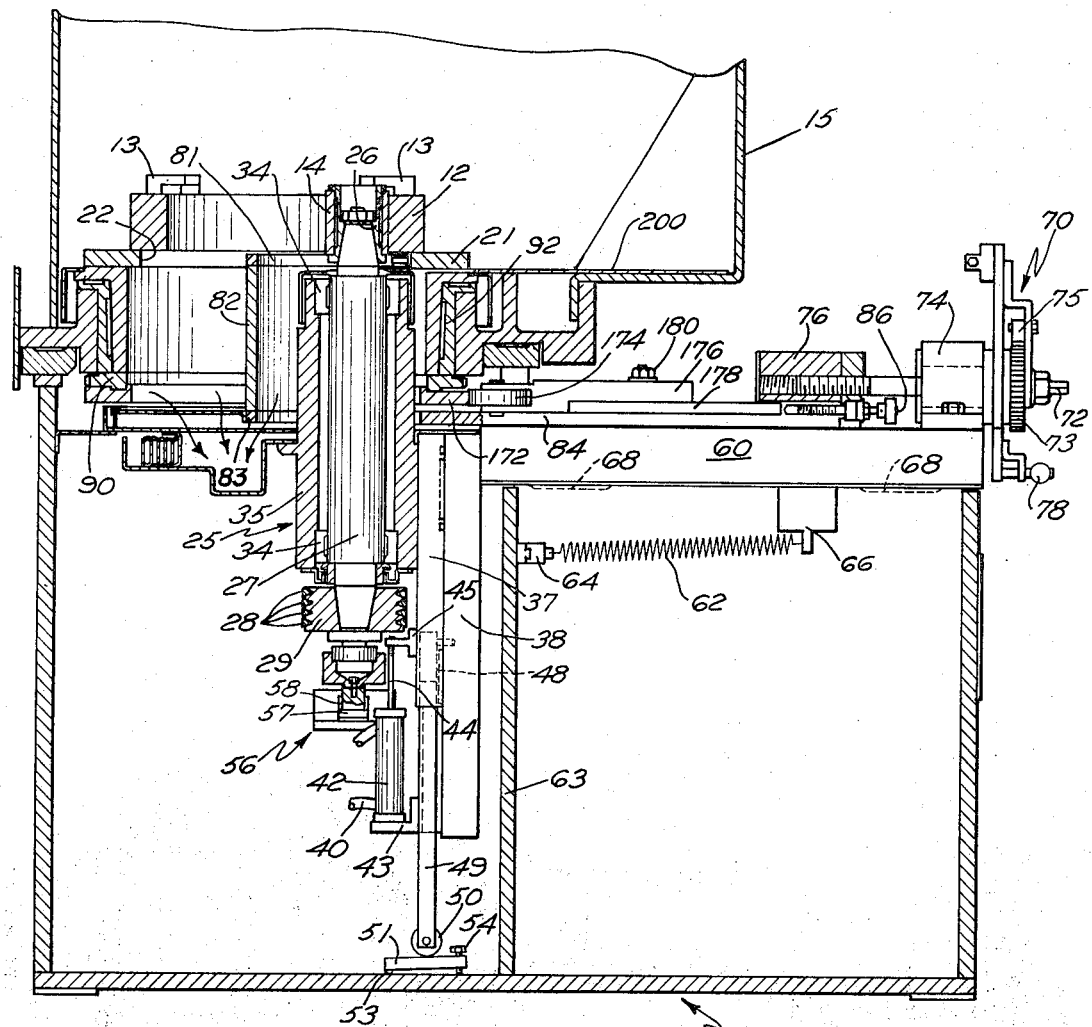
FIG. 3 is an end sectional view illustrating parts of the bore grinding machine in cross section.
Figure 5:
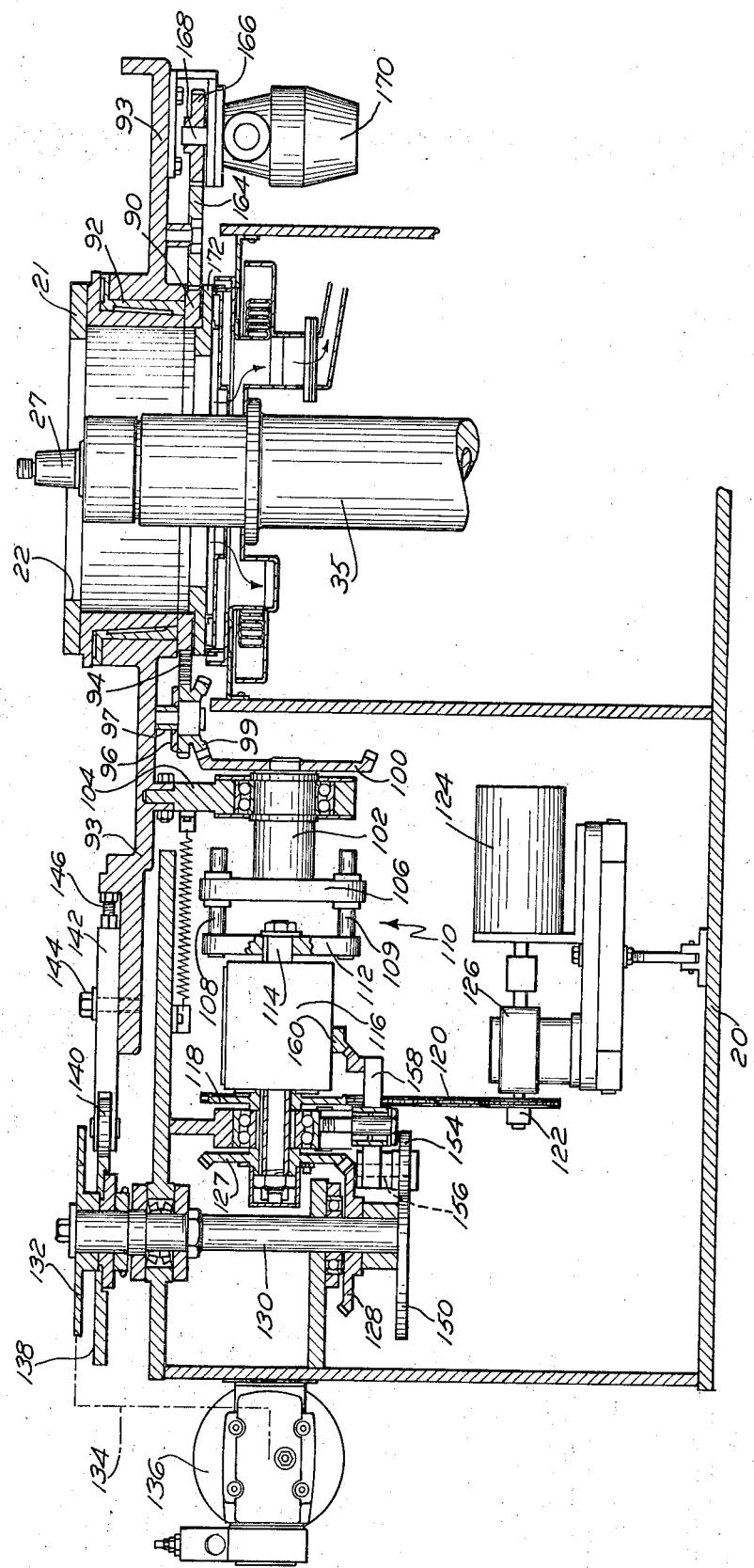
FIG. 5 is a front sectional view illustrating portions broken away and portions in cross section.

Looking in FIGS. 3 and 5, some of the basic components of the machine viewed are base 20, horizontal work table 21 with its central area cut away to form a passageway opening 22, and vertical tool spindle assembly 25. Mounted at the top of the vertical grinding wheel spindle is a grinding wheel sleeve 26 upon which grinding wheel 14 is secured. Spindle 27 of assembly 25 is given rotational motion by belts 28 which are connected around sheave 29 secured to the bottom of the spindle 27 and also around sheave 30 (FIG. 1) which is mounted on a rotatably driven shaft extending downwardly from motor 31. Spindle 27 is also rotatably mounted in hydrostatic pocket bearings 34 which provide the needed stiffness for the grinding wheel 14 during its roughing cuts and they also provide the needed smoothness for fine finishes. Surrounding spindle 27 and hydrostatic pocket bearings 34 is housing 35 which has a vertical slide 37 attached along one of its vertical walls. This slide travels upwardly and downwardly along guide or track members 38 when the grinding wheel 14 is raised up into its grinding position within the workpiece. This operation is accomplished by a predetermined signal that opens a valve releasing fluid through tube 40 into vertical feed cylinder 42 which is mounted by bracket 43 to the guide member 38. As the fluid enters cylinder 42 a piston within drives rod 44 attached thereto upwardly and since bracket 45 is secured both to the upper end of rod 44 and slide 37 the spindle assembly is lifted upwardly. In order to help guide 38 support the weight of spindle assembly 25 a second cylinder 48 is bored in slide 37. Constant fluid pressure is forced into cylinder 48 causing a reaction against support piston 49 thus keeping roller 50 attached to the end of the piston 49 in contant rolling and supporting position on block 51 as slide 37 moves up and down. Block 51 is pivotally secured to base 20 at point 53 and its free end may have its height adjusted by screw 54 to position top of block 51 horizontal. The utilization of block 51 will be discussed later when the operation of the grinding wheel feed slide is considered. Additionally wheel spindle reciprocator 56 when supplied with pulsating fluid pressure under piston 57 in cylinder 58 gives a 1/8 inch vertical stroke to the grinding wheel spindle with the spindle sliding axially in its own hydrostatic bearings thus allowing the machine to obtain the best possible surface finishes.

When during the grinding operation the outer surface of the grinding wheel becomes worn away it is necessary to have the vertical spindle assembly 25 drawn to the right as seen in FIG. 3. This is controlled by wheel feed slide 60 which is caused to move to the right as the grinding wheel diameter becomes smaller. As the wheel feed slide 60 travels to the right, roller 50 at the bottom of support piston 49 also travels to the right along block 51. All the while this is happening spring 62 which is secured to the bottom of slide 60 by bracket 66 is continually urging the slide toward the left since the other end of the spring is attached to vertical member 63 by bracket 64. Slide 60 is also mounted on hydrostatic bearings 68.

The manner in which the wheel slide 60 is automatically drawn to the right will now be described. Wheel feed mechanism 70 has its shaft 72 journalled in bearing 74 fixedly secured to wheel slide 60. Shaft 72 has its forward end threadedly received in bridge 76 whose opposite ends are guided on slide 60. Hydraulic cylinder 78 rotates shaft 72 through ratchet 73 and pawl 75 to feed the grinding wheel to the work to remove stock from the work piece. Also shaft 72 is rotated in a like manner through ratchet 73 and a pawl and cylinder, both not shown, during the diamond dressing operation of the outer surface of the wheel between the rough and finish cuts.

Figure 6:
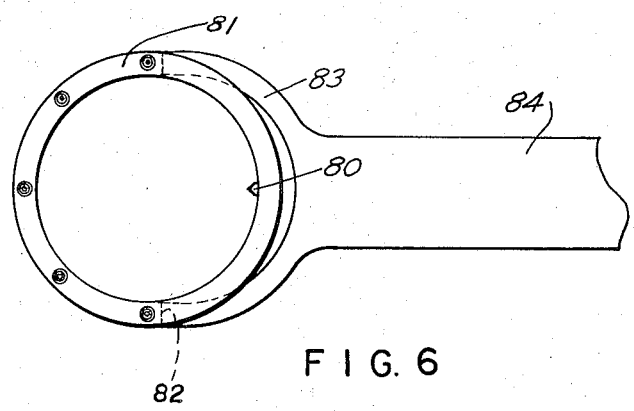
FIG. 6 is a partial top plan view of the diamond holder and diamond slide.

The manner in which the outer surface of the grinding wheel 14 is dressed is as follows. Between the roughing and finish cuts the grinding wheel spindle 27 is automatically retracted downwardly and diamond 80 trues up the outer surface of the grinding wheel. The diamond is mounted in holder 81 which is circular and which surrounds the grinding wheel. Diamond holder support 82 is semi-cylindrical and is secured beneath circular holder 81 by screws shown in FIG. 6 and at its bottom it is attached to the open centered elliptical end 82 of diamond slide 84. The diamond slide itself may be adjusted inwardly or outwardly with respect to the grinding wheel by means of dressing diamond adjustment 86 mounted under bridge 76.

At the same time that the grinding wheel 14 is rotating about a substantially stationary vertical axis, the work piece is both rotating and moving along the x axis of the horizontal plane. The rotational motion of the work piece results from the following. The work table 21 upon which the work piece has been secured by hydraulic work clamps 13 is mounted in hydrostatic bearings 92 supported on work table support member 93. Secured to the bottom of work table 21 is work rotation gear 90 which as seen in FIG. 5 meshes with spur idler gear 94 which in turn meshes with spur gear 96 that is mounted on shaft 97. Also mounted on shaft 97 is bevel gear 99 whose teeth engage bevel gear 100 that is in turn mounted on shaft 102. Shaft 102 is journalled in bearing support arm 104 whose upper extremity is secured to work table support member 93. Secured to the left end of shaft 102 is a cross beam member 106 whose opposite ends each have bores that receive shafts 108 and 109 of sliding coupling 110. This coupling allows the rotational drive to be maintained even when work table support 93 has been shifted laterally to the right. Cross beam 112 is secured to shaft 114 which passes through differential gear box 116. Also mounted on this shaft is sprocket gear 118 which has chain 120 passing around it and sprocket gear 122. Rotational movement is given to sprocket gear 122 from variable hydraulic motor 124 whose shaft is coupled to speed reducer 126.

The coupling from hydraulic motor 124 to shaft 114 also drives bevel gear 127 that meshes with a second bevel gear 128 mounted on cam shaft 130. Cam shaft 130 has a plurality of cam members mounted thereon. At its top is mounted the work table speed control cam 132 which is connected by linkage 134 to the variable displacement pump 136 which supplies motor 124. Immediately beneath cam 132 is mounted side motion cam 138 which through side motion cam follower 140 controls the sideward or x axis motion of work table 21. Cam follower 140 is mounted on horizontal roll slide 142. Roll slide 142 is attached to work table support 93 by bolt 144 with adjustment means 146 being able to control the centering of the work relative to the grinding wheel.

The third cam mounted on cam shaft 130 is angular relationship cam 150 which functions to vary the work rotation rate in either a positive or negative direction by changing the angular orientation of the differential case 116. This is accomplished by the rolling contact of differential cam roll 154 mounted on shaft 156 that passes through gear segment lever 158 whose teeth mesh with the teeth of gear 160 mounted on the outside of the differential gear box. At the right side of work rotation gear 90 its teeth engage the teeth of spur idler gear 164. This gear is in turn meshed with gear 166 that is mounted on shaft 168 that extends from the hydraulic torque motor 170 and it is this motor that keeps the differential roll 154 against cam 150.

The wheel feed slide 60 is movable in the y horizontal axis since fixedly secured to the bottom of work rotation gear 90 is wheel feed cam 172. As this cam is caused to rotate by the rotation of gear 90 the wheel slide is displaced along the y axis due to the rolling contact of cam 172 with cam follower 174 which is fixedly mounted in cam follower holder 176. The spacing of work center and grinding wheel center may be varied by adjustment of member 176 with respect to feed slide bracket 178 and by clamping them together by the use of bolt 180.

Figure 4:
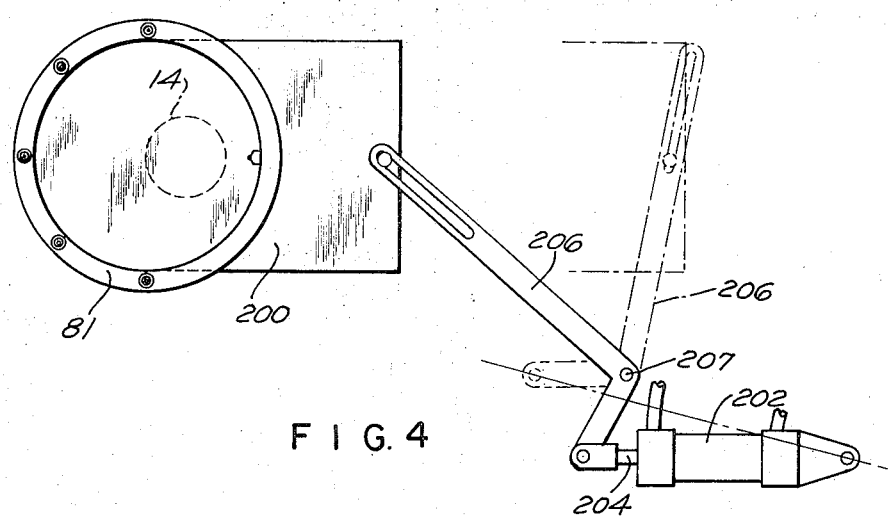
FIG. 4 is a top plan view of the sliding cover unit.

The operation of applicants' bore grinding machine is as follows. First a work piece to be machined is loaded upon the work table and the cycle starts. The part is automatically clamped in place by the hydraulic work clamps 13 and combination wheel guard and coolant hood 15 closes over the top of the work piece and work table. Next the wheel guard safety cover plate 200 (see FIG. 4) retracts in response to the switch that sends fluid into cylinder 202 causing its piston to drive rod 204 forward. Forward movement of rod 204 turns lever 206 around pivot 207 to move plate 200 back from its covering position. Next the wheel spindle is raised to its grinding position and coolant starts to flow within said hood and the work table begins to rotate and also to move along the x axis of the horizontal plane in a predetermined manner. The part is rough ground at preset feeds and speeds followed by a semi finish grind cycle also at preset feeds and speeds. The wheel is then automatically dressed as it retracts downward into or raised from the base or upon both movements. The dressing mechanism also incorporates an automatic wheel wear compensation mechanism. Next the grinding wheel is raised again the the finish grind cycle commences at preset feeds and speeds. As this operation is completed, the flow of coolant ceases and the grinding wheel retracts into the base with the grinding wheel still rotating. The safety guard cover then automatically moves over the wheel and the combination wheel guard and coolant hood opens. The part is automatically unclamped and the finished work piece may then be unloaded. This would end a complete cycle with a new cycle beginning upon reloading of the machine.

What is claimed is:

1. A bore grinding machine comprising,
   a base,
   a horizontal work table, means for rotatably mounting said table on said base, said work table having a portion of its central area cut away to form a passageway opening,
   a vertical tool spindle assembly mounted within said opening, means for vertically raising a portion of said spindle assembly above the top surface of said work table and for lowering it back into said passageway opening whereby a grinding wheel mounted on the top of said spindle assembly will be out of the way and below the top of the table during loading and unloading of work pieces to be machined.

2. A bore grinding machine as recited in claim 1 further comprising wheel dressing means mounted below the top of the opening in said work table whereby a grinding wheel mounted on said spindle may have its surface dressed upon movement through said opening.

3. A bore grinding machine as recited in claim 1 further comprising guard cover means mounted below the top of the opening in said work table whereby a grinding wheel mounted on said spindle will be stored safely out of the way of a worker when changing the work pieces being machined on the top surface of said work table.

4. A bore grinding machine as recited in claim 1 further comprising wheel guard and coolant hood means mounted on said base that covers the work piece and work table during the grinding operation to eliminate danger to the machine operator from the rotating grinding wheel and also from the metal particles removed from the work piece and additionally to prevent coolant from being sprayed all over the place.

5. A bore grinding machine as recited in claim 1 wherein said means fo rotatably mounting said table comprises a work rotation gear mechanically connected to drive means.

6. A bore grinding machine as recited in claim 5 further comprising cam means for controlling linear movement of said work table.

7. A bore grinding machine as recited in claim 1 further comprising means for vertically reciprocating said vertical tool spindle assembly.

* * * * *

UNITED STATES PATENT OFFICE
CERTIFICATE OF CORRECTION

Patent No. 3,800,470      Dated April 2, 1974

Inventor(s) George Napoleon Levesque and Alexander Norval Booth, Jr.

It is certified that error appears in the above-identified patent and that said Letters Patent are hereby corrected as shown below:

In the first column, line 5, the listing of the Assignee should be corrected to read as follows:

"[73] Assignee: Brown & Sharpe Manufacturing
                  Company, North Kingstown, R. I. "

Signed and sealed this 10th day of September 1974.

(SEAL)
Attest:

McCOY M. GIBSON, JR.           C. MARSHALL DANN
Attesting Officer               Commissioner of Patents